United States Patent Office.

JOSEPH GALETTE, OF NEW YORK, N. Y.

Letters Patent No. 66,482, dated July 9, 1867.

---

IMPROVED ANTI-RHEUMATIC LINIMENT.

---

*The Schedule referred to in these Letters Patent and making part of the same.*

---

TO ALL WHOM IT MAY CONCERN:

Be it known that I, JOSEPH GALETTE, of the city, county, and State of New York, have invented a new Anti-Rheumatic Liniment; and I do hereby declare the following to be a full and exact description of the composition, and mode of application thereof.

The nature of my invention consists in producing a liquid compound of various narcotic, nervine, blood-purifying, and cutaneous remedies and adjuvants. The liniment being applied on the exterior of the parts of the body affected with rheumatism, the various ingredients will each operate its peculiar effect. The narcotics in the compound will effect instantaneous relief from pain, and will, opening the pores and passing into the muscular cells, counteract the inspissation of the muscular fluids. The nervine substances will invigorate the nerves and strengthen the system. The blood-purifying substances draw all the poisons and impurities contained in the blood to the surface of the skin, and the skin is healed by the cutaneous remedies intermixed in my said liniment. By means of this liniment, all the characteristics of rheumatism, that is to say, all the pains and aches by which rheumatism, acute or chronic, manifests its presence, are provided for. The liniment is therefore properly considered a universal cure for rheumatism.

To enable others skilled in the art to make and use my invention, I will proceed to describe the same.

I take of *Oleum Crotonis*, one pound; *Oleum creosoti*, two pounds; *Oleum hyosciami*, four pounds; *Oleum cajeputi*, four pounds; *Liquor ammoniæ cautici*, eight pounds; *Tinctura arnica*, four pounds; *Aqua lauro-cerasi*, four pounds; *Tinctura cantharidis*, two pounds; rectified alcohol, six gallons. To these ingredients I add other narcotics, in proper proportion, such as chloroform, *Tinctura belladonna*, *Tinctura opii*, simple; and others of the known narcotics may be used instead of the three last-named adjuvants. All the ingredients (except of course alcohol) are first dissolved in alcohol. After they are dissolved, I intermix the various ingredients with each other in the following manner: I pour two ingredients (dissolved as aforesaid) into one vessel and stir this compound, leaving the same to rest for twenty-four hours; then I add the third ingredient, stir this new compound, and then let it rest for twenty-four hours; and proceed in the same manner with this new compound, and so on, until all the ingredients are intermixed.

The two ingredients first above named are narcotics. On entering the cellules of the muscles, the obdurated or inspissated fluids in said cellules contained are dissolved to their normal state; the fluids then resume their functions. The two following ingredients are calculated to act upon the nerves and to strengthen the system. *Liquor ammoniæ cautici* is a cutaneous remedy; it tends to open the pores and to keep the skin in a healthy state. The three following ingredients are also more or less narcotic, but they act principally upon the blood. By the affinity which these substances have for the poisonous substances contained in the blood, they draw all these poisonous substances from the blood, which poisons and impurities are coming to the surface by a cutaneous eruption. This eruption is healed by the cutaneous remedy contained in the compound. The other ingredients named are narcotics, the quality of which is well known; these serve as adjuvants to the various ingredients named, and are not essential to the liniment. Other narcotics, such as *Oleum sinapis*, may be substituted in their place; the purpose of these last-named ingredients being mainly to effect instantaneous relief. Alcohol is mainly used for the purpose of dissolving the other ingredients; it can be added in different quantities, according to the desired strength of the liniment. All the ingredients are combined by mere mechanical mixture; no chemical combination taking place.

What I claim as my invention, and desire to secure by Letters Patent of the United States, is—

1. The use of *Oleum Crotonis* and *Oleum creosoti*, in combination with other substances, as a remedy against rheumatism.

2. The compounding and mixing of the new anti-rheumatic liniment, substantially as herein described, and for the purpose specified.

JOSEPH GALETTE.

Witnesses:
HENRY WEHLE,
I. GOLDZIER.